March 2, 1971  L. J. WINDECKER  3,567,568
IMPACT RESISTANT SHEET AND METHOD FOR THE PREPARATION THEREOF
Filed Sept. 29, 1967
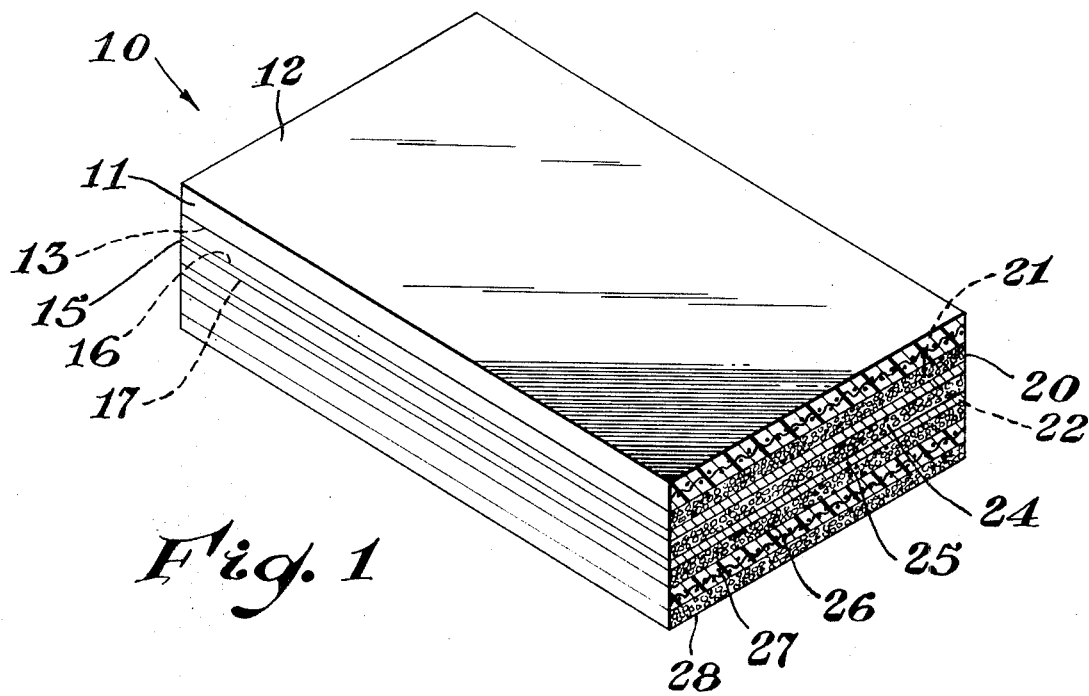
Fig. 1
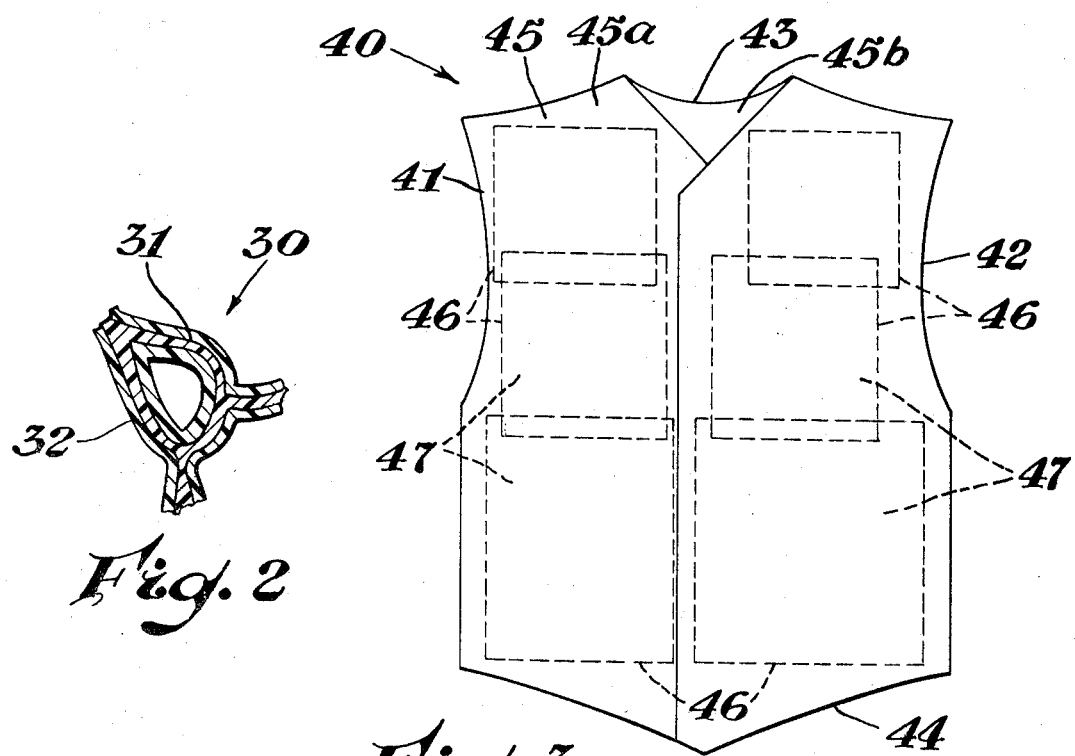
Fig. 2
Fig. 3
INVENTOR.
Leo J. Windecker
BY
AGENT

United States Patent Office 3,567,568
Patented Mar. 2, 1971

3,567,568
IMPACT RESISTANT SHEET AND METHOD FOR THE PREPARATION THEREOF
Leo J. Windecker, Midland, Tex., assignor to The Dow Chemical Company, Midland, Mich.
Filed Sept. 29, 1967, Ser. No. 671,791
Int. Cl. B32b 5/26, 7/02; B41k 1/02
U.S. Cl. 161—93                         5 Claims

ABSTRACT OF THE DISCLOSURE

Bullet proof sheets and sheets having high impact resistance are prepared by forming a laminate of resin-glass fiber layers and layers of an open-celled flexible foam with an elastomer and retaining the open-celled configuration.

---

This invention relates to impact resistant sheets and to a method for the preparation thereof, and more particularly relates to impact resistant sheets which can be projectile resistant, and a method for preparing such sheets.

Oftentimes, it is desirable to prepare structures which are highly resistant to impact for many applications including resistance to projectiles and the like. Beneficially, for many applications it is desirable that an impact resistant sheet at least partially absorb a shock imparted thereto and distributed over a relatively broad area. Impact resistant sheets have been prepared using resin-glass fiber laminates. These sheets oftentimes are relatively heavy and when resistant to a given impact tend to transmit at least a major portion of the impact to an object supporting the sheet over a relatively small area such as in the case of a flexible metal plate or a structure of glass fibers in an epoxy or polyester resin matrix.

It would be beneficial if there were available an improved impact resistant sheet of lightweight having vibration damping characteristics.

It would also be desirable if such a sheet in transmitting localized impact applied thereto would distribute such an impact over a relatively wide area.

It would also be desirable for many applications if such a sheet was thermally insulating.

It would further be desirable if there were available an improved method for preparing such a sheet.

These benefits and other advantages in accordance with the present invention are achieved in a method for preparing a laminate sheet comprising providing at least a first layer, the first layer comprising a high strength rigid laminar element, a second layer, the second layer comprising a high strength rigid laminar element, preparing a third layer by impregnating a flexible open-celled foam with a composition which forms a flexible material to provide a layer of the flexible material over the surfaces of the foam while retaining its open-celled characteristic, the third layer having a first major face and a second major face, adhering the first and second layers to the first and second major faces of the third layer, respectively, thereby providing an impact resistant sheet.

Also contemplated within the scope of the present invention is an improved impact resistant sheet, the impact resistant sheet comprising at least a first layer of a high strength solid impact resistant material, a second layer of a high strength solid impact resistant material, a third or core layer having first and second major faces, the core layer comprising a flexible open-celled foam having internal surfaces, the internal surfaces being coated with a flexible material to an extent sufficient to retain the open-celled configuration, the first and second layers being adhered to the first and second faces of the high strength material.

Beneficially, in the practice of the present invention, a wide variety of high strength solid layers can be employed, including steel, stainless steel, aluminum, brass, glass fiber-reinforced resins which include epoxy resins, polyester resins in combination with glass cloth, glass roving, glass mat and the like. The open-celled foam may be of any commercially available material such as flexible polyurethane foams, sponge rubber, cellulose foam, polyvinyl chloride foams and the like. The foams must be of the variety having at least 50 percent and preferably 85 percent open cells to facilitate impregnation with the flexible material. The particular method employed to impregnate the foam is not critical. One simple but effective method is that of passing the foam through a vat containing a solution dispersion of the flexible material or a liquid curable to a flexible material then squeezing out excess material by withdrawing foam from the vat through a set of pressure rolls. The open cells of the foam are thereby coated with a layer of coating composition which ultimately stiffens, producing a lightweight foam having flexible properties proportional to the amount of material deposited within the foam and the physical characteristics of the material. The amount of flexible material left in the foam can be controlled largely by the pressure on the rolls used to express the coating composition. When a low density layer is desired, maximum pressure should be applied by the rolls. Less pressure should be used where higher compression and tensile strength are desired and the density is less critical. The critical characteristics for flexible material employed in the practice of the present invention is that on being subjected to a load of 50 pounds per square inch for a period of 24 hours at 20° C., at least 75 percent recovery is obtained.

A wide variety of flexible or elastomeric or elastomer-like materials may be employed, including plasticized polyvinyl chloride, flexible polyurethanes, elastomers, including elastoprenes, elastolenes and elastothiomers as defined in H. L. Fisher's article "Nomenclature of Synthetic Rubbers," Industrial and Engineering Chemistry, vol. 31, page 941, 1939, and including butadiene rubbers, piperylene rubbers, isoprene rubbers, dimethyl butadiene rubbers and haloprene rubbers. "Elastomer" is defined in the same article by Fisher, and as used in the present application encompasses polymers such as polyisobutylene. "Elastothiomer" encompasses the elastomeric polyalkylene sulfides.

Composite articles are prepared in accordance with the present invention by preparing suitable sheets of flexible material-impregnated flexible open-celled foam as hereinbefore described and assembling such sheets in generally alternating arrangement wit hhigh strength sheets. Oftentimes, it is possible to employ the flexible material used to impregnate the open-celled foam sheet as an adhesive and by curing or drying the open-celled sheet in suitable surface contact with the high strength elements, an integral laminate is obtained. Alternatively, if desired, impregnated open-celled foam is cured or dried and subsequently laminated to the high strength elements using a suitable adhesive such as an epoxy resin adhesive, contact element or by heat sealing.

Further features and advantages of the present invention will become more apparent from the following specification when taken in connection wtih the drawing wherein:

FIG. 1 is a view of a laminate structure.

FIG. 2 is an enlarged sectional view of a small portion of a layer of the laminate structure of FIG. 1.

FIG. 3 depicts a garment employing the laminates of the invention.

In FIG. 1 there is depicted a laminate structure in accordance with the present invention generally designated by the reference numeral 10. The structure 10 comprises a first high strength element 11 having a first surface 12 and a second surface 13. A second high strength element 15 is disposed in spaced adjacent relationship to the first high strength element 12. The element 15 has a first face 16 and a second face 17. A flexible material-impregnated third layer or core 20 is disposed between the high strength elements 11 and 15. The core 20 has a first major surface 21 and a second major surface 22. The first major surface 21 is adhered to the second surface 13 of the first high strength element 11. The second major surface 22 of the third layer 20 is adhered to the first face 16 of the second high strength element or layer 15. Similarly, a fourth layer 24 of flexible material-impregnated open-celled foam is adhered to the second face 17 of the high strength element 15 which in turn is adhered to a fifth layer or third high strength element 25. Remote from the open-celled foam layer 24 is a sixth layer 26 of an open-celled flexible material-impregnated foam. Adhered to the high strength layer 25 remote from the layer 24, a seventh layer 27 of a high strength element in turn is adhered to the layer 26. An eighth layer 28 of flexible material-impregnated foam is adhered to the seventh layer 27.

In FIG. 2 there is depicted an enlarged sectional view of a portion of a layer such as the layer 20 generally designated by the reference numeral 30. The structure 30 comprises a flexible open-celled foam 31 having disposed thereon a generally continuous outer layer 32 of a flexible material.

In FIG. 3 there is depicted a garment generally designated by the reference numeral 40. The garment 40 defines openings 41, 42, 43 and 44 adapted to admit portions of the human body. The garment 40 comprises a flexible fabric body portion 45 comprising at least an outer layer of fabric 45a and an inner layer of fabric 45b defining a plurality of pockets therein generally designated by the reference numeral 46. Disposed within each of the pockets 46 is an impact resistant panel designated by the reference numeral 47. Beneficially, the pockets overlap permitting overlap of the panels 47 thereby providing a projectile resistant garment.

By way of further illustration, a plurality of layers of woven glass cloth are impregnated with an epoxy resin which is a diglycidyl ether of Bisphenol A containing diethylene diamine as a catalyst. The sheet is cured at 150° F. for a period of four hours and subsequently cut into three smaller pieces of equal size. Thirty parts by weight of the foregoing epoxy resin composition are admixed with 70 parts by weight of a rubber which is a finely divided copolymer of 60 weight percent butadiene and 40 weight percent acrylonitrile. An open-celled polyurethane foam is impregnated with the epoxy resin-rubber mixture, the foam squeezed to expel excess rubber mixture to form a coating of the rubber mixture on the foam and permit it to retain its open-celled configuratoin. A sandwhich is formed by applying to one of the previously prepared sheets a layer of the epoxy resin-acrylonitrile copolymer-impregnated foam having a thickness of about twice the thickness of the epoxy resin-glass fiber sheet, placing a second sheet of the glass reinforced epoxy resin sheet thereon, adding a second layer of the epoxy resin-butadiene-acrylonitrile-impregnated foam and adding the third sheet to form a five-layered sandwich having outer layers and a center layer of the glass fiber-reinforced epoxy resin and two intermediate layers of the epoxy resin-butadiene-acrylonitrile rubber-impregnated polyurethane foam. The sandwhich prepared in this manner is cured at a temperature of 125° F. for 48 hours. The resultant sheet is extremely tough, impact resistant and does not readily transmit point loads from one face to the opposite face. The sheet effectively stops ballistic projectiles without significant damage to the sheet.

Similar beneficial and advantageous results are obtained when the butadiene-acrylonitrile polymer is replaced with a flexible polymer of 50 percent butadiene and 50 percent styrene; polyisobutylene; a rubbery polyalkylene sulfide prepared by reacting ethylene dichloride and sodium polysulfide to produce a product having the formula $(C_4H_8S_4)_n$. Such polyalkylene sulfide rubbers are commercially available under the trade name of Thiokol MX, a copolymer of 60 weight percent chloroprene and 40 weight percent isoprene.

Beneficial results are also obtained when the epoxy resin in both the sheet and core is replaced with a polyester resin such as a polyester containing 40 weight percent styrene monomer and 60 weight percent polyester resin solids, the polyester having the following approximate composition: 47 mole percent isophthalate, 51 mole percent fumarate and 2 mole percent maleate or a glycol mixture containing 20 weight percent of an ethylene glycol and 80 weight percent diethylene glycol. Also beneficially employed is a polyester composition containing 40 weight percent o-chlorostyrene, 60 weight percent polyester resin solids, the polyester resin being a mixture containing 43 mole percent isophthalate, 52 mole percent fumarate and 5 mole percent maleate of a glycol mixture containing 80 weight percent diethylene glycol and 20 weight percent ethylene glycol.

Sheets in accordance with the present invention are highly desirable in a variety of applications where impact resistance is desired including packages to be dropped by parachute.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim:
1. An impact resistant sheet comprising at least:
   a first layer of a high strength solid impact resistant material,
   a second layer of a high strength solid impact resistant material,
   a third or core layer having first and second major surfaces, the core layer comprising a flexible open-celled foam having:
      internal surfaces, the internal surfaces being coated with a flexible elastomeric composition to an extent sufficient to retain the open-celled configuration, the first and second layers being adhered to the first and second faces of the high strength material.

2. The sheet of claim 1 wherein the impact resistant material is a glass fiber-reinforced resinous sheet.

3. The sheet of claim 1 wherein the open-celled foam is a polyurethane foam.

4. The sheet of claim 1 wherein the core layer has disposed therein at least one layer of high strength solid impact resistant sheet generally parallel to the first and second layers.

5. The sheet of claim 1 wherein the impact resistant layers of sheets are glass fiber-reinforced epoxy resin.

References Cited
UNITED STATES PATENTS 3,269,887   8/1966   Windecker          161—160

WILLIAM J. VAN BALEN, Primary Examiner

U.S. Cl. X.R.

2—2.5; 89—36; 161—161, 165, 404